US012592338B2

(12) United States Patent
Zeller et al.

(10) Patent No.: US 12,592,338 B2
(45) Date of Patent: Mar. 31, 2026

(54) CAPACITOR UNIT FOR A POWER CONVERTER AND METHOD FOR MANUFACTURING A CAPACITOR UNIT

(71) Applicant: ZF Friedrichshafen AG, Friedrichshafen (DE)

(72) Inventors: Jonas Zeller, Friedrichshafen (DE); Michael Kohr, Bodnegg (DE); Pengshuai Wang, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/355,230

(22) Filed: Jul. 19, 2023

(65) Prior Publication Data

US 2024/0030692 A1     Jan. 25, 2024

(30) Foreign Application Priority Data

Jul. 21, 2022    (DE) ......................... 102022207469.6

(51) Int. Cl.
| | |
|---|---|
| *H01G 2/08* | (2006.01) |
| *H01G 4/228* | (2006.01) |
| *H01G 4/38* | (2006.01) |
| *B60L 50/40* | (2019.01) |
| *H02P 27/06* | (2006.01) |

(52) U.S. Cl.
CPC ............... *H01G 2/08* (2013.01); *H01G 4/228* (2013.01); *H01G 4/38* (2013.01); *B60L 50/40* (2019.02); *H02P 27/06* (2013.01)

(58) Field of Classification Search
None
See application file for complete search history.

(56) References Cited

U.S. PATENT DOCUMENTS

| | | | | | |
|---|---|---|---|---|---|
| 5,953,201 | A | * | 9/1999 | Jakoubovitch | ........... H01G 4/38 361/328 |
| 7,864,506 | B2 | * | 1/2011 | Pal | ........................ H01G 9/0003 361/321.1 |
| 2010/0015512 | A1 | * | 1/2010 | Inoue | .................. H01M 10/643 361/714 |
| 2010/0039748 | A1 | * | 2/2010 | Fujii | ...................... H01G 4/224 361/274.1 |
| 2011/0149625 | A1 | * | 6/2011 | Azuma | .................... B60K 6/48 363/141 |

(Continued)

FOREIGN PATENT DOCUMENTS

| | | | | | |
|---|---|---|---|---|---|
| DE | 102004035810 | A1 | * | 2/2006 | ............... H01G 2/08 |
| DE | 10 2015 211 202 | A1 | | 12/2015 | |

(Continued)

*Primary Examiner* — Eric W Thomas
(74) *Attorney, Agent, or Firm* — Crowell & Moring LLP

(57) ABSTRACT

A capacitor unit for a power converter, wherein the capacitor unit has a first busbar and a second busbar, and at least one capacitor element placed in between the first busbar and the second busbar, wherein the capacitor element is electrically connected to the first busbar at a first side, and wherein the capacitor element is electrically connected to the second busbar at a second side, lying opposite the first side, and a cooling device, wherein the cooling device is thermally coupled to the first busbar with a surface area contact, wherein the cooling device is designed to remove heat from the first busbar.

20 Claims, 6 Drawing Sheets

(56)                    References Cited

U.S. PATENT DOCUMENTS

2014/0286064 A1 *   9/2014   Kamizuma  .............. H01G 2/08
                                                                361/301.5
2015/0313002 A1 *  10/2015   Krivonak  ............. H05K 5/0026
                                                                174/254
2018/0342350 A1 *  11/2018   Koyama  .................. H01G 2/04

FOREIGN PATENT DOCUMENTS

JP        2008061282  A  *   3/2008
WO     WO-2022158267  A1 *   7/2022

* cited by examiner

135

CAPACITOR UNIT FOR A POWER CONVERTER AND METHOD FOR MANUFACTURING A CAPACITOR UNIT

CROSS-REFERENCE TO RELATED APPLICATION

This application claims priority to German Application No. DE 10 2022 207 469.6, filed on Jul. 21, 2022, the entirety of which is hereby fully incorporated by reference herein.

FIELD

The present invention relates to a capacitor unit for a power converter, a power converter, an electric axle drive, a motor vehicle, and a method for producing a capacitor unit.

BACKGROUND AND SUMMARY

Power converters are used in many fields, including the automotive industry.

DE 10 2015 211 202 A1 describes a converter housing that is installed in a vehicle and has a plate-shaped body.

Based on this, the present invention results in an improved capacitor unit for a power converter, an improved power converter, an improved electric axle drive, an improved motor vehicle, and an improved method for producing a capacitor unit according to the present disclosure. Advantageous embodiments can also be derived from the following description.

The proposed approach results in a means of extending the service life and reducing the costs for capacitors. Furthermore, capacitors and capacitor units with lower dielectric strengths can be used, resulting in a reduction in the overall sizes of the capacitors.

A capacitor unit for a power converter is proposed that has a first busbar and a second busbar, as well as at least one capacitor element, which is in between the first busbar and second busbar. The capacitor element is electrically connected at one side to the first busbar and at a second side, opposite the first side, to the second busbar. The capacitor unit also has a cooling device, which is thermally coupled over with a surface area contact to the first busbar. The cooling device is designed to remove heat from the first busbar.

The busbars can also be simply referred to as buses, which can be electrically coupled to at least one capacitor element in the form of a winding. Because the capacitor element generates heat when current flows through it, it is advantageous to couple a cooling device in the form of a cooler or heat sink thereto. The capacitor unit can advantageously have a compact design.

According to one embodiment, the cooling device can have an electrically insulated thermal conductor and a cooling body for discharging heat, in which the thermal conductor is in between the first busbar and the cooling body and can be thermally coupled thereto. The thermal conductor can be designed to transfer heat from the first busbar to the cooling body. This means that the thermal conductor can come in surface contact with cooling body and the first busbar. This advantageously reduces the space it occupies and extends the service life of the capacitor unit, because the cooling thereof reduces the danger of damages caused by overheating.

The thermal conductor can be formed by an adhesive film. This adhesive film can be easily put securely in place and also be used to hold the cooling body in place. Instead of an adhesive film, a thermally conductive paste or some other thermally conductive medium can be used for the thermal conductor.

The second busbar, on the second side of the capacitor element, can be have at least one spring element, which can be pretensioned against the capacitor element. In particular, the spring element can press the capacitor toward the first busbar. The spring element can therefore form a contact arm that compensates for tolerances in the capacitor element, e.g. with regard to its winding. The spring ensures that despite a different number of windings in capacitor elements, both the first and second busbars can come in contact with the capacitor element. In simple terms, the capacitor unit can have capacitor elements with different windings with which electrical contact can be made, thus resulting in an improved functionality of the capacitor unit.

According to one embodiment, the spring element can form a step that comes in contact with the capacitor element over its surface area. The step can comprise a short section and a long section adjoining the short section, with the long section coming in contact with the capacitor element. This long section advantageously comes in contact with the capacitor element over its surface area.

The first and second busbars can form steps at their edges. In particular, a part of the capacitor element bordering on these edge regions can be in between the busbars. The busbars can have numerous steps at their edges, the sections of which are at least of nearly equal lengths. As a result of this stepped design, the necessary assembly space can be reduced and/or they can be adapted to a given assembly space.

The capacitor unit can have a housing that can encase at least a part of the busbars, the capacitor element, and the cooling device in a liquid-tight manner. The housing can be designed to protect the capacitor unit and the individual components in the capacitor unit from external effects. The housing can also advantageously contain a plastic. By way of example, the housing can form a plastic shell.

The housing can also have a hole through which a fixative and/or potting compound can be injected. The hole can be at the edge of the busbars when the capacitor unit is assembled, such that the fixative can be injected therein. The fixative can be formed by a potting compound. This results in an advantageous production of the capacitor unit.

According to one embodiment, the capacitor unit can have an insulating layer that electrically insulates the first busbar from the second busbar in that the insulating layer is placed between the first busbar and the second busbar. In particular, the insulating layer can be formed by an insulating paper, and/or placed in a step-shaped edge region of the busbars. The insulating layer can be placed in the edge region of the busbars where they are parallel to one another on opposite sides of the insulating layer.

The capacitor unit can contain at least one other capacitor element, which can be placed between the first busbar and the second busbar. The second capacitor can be connected to the first busbar at its first side, and to the second busbar at its second side. The capacitor unit can also advantageously contain numerous capacitor elements with different windings. Furthermore, if these capacitor elements are of different sizes, tolerances can be compensated for by the second busbar, specifically by its at least one spring element, such that contact is reliably established to all of the capacitor elements.

The invention also relates to a power converter, in particular an inverter for a motor vehicle, which has one embodiment of the capacitor unit specified herein. The power converter is distinguished in particular by the capacitor unit described above.

According to one embodiment, the capacitor unit can form a link capacitor. In other words, the capacitor unit can function as a link capacitor for the power converter.

The invention also relates to an electric axle drive for a motor vehicle that has at least one electric machine, one transmission, and one embodiment of the inverter specified herein. The electric axle drive is distinguished in particular by the design of the power converter described herein.

The transmission can have a gearing for reducing the rotational rate of the electric machine and a differential.

The invention also relates to a motor vehicle that has an embodiment of the electric axle drive specified herein, and/or an embodiment of the power converter specified herein. The motor vehicle is distinguished in particular by the design of the electric axle drive and/or the power converter described herein.

Furthermore, a method is proposed for producing one of the variations of the capacitor unit specified above, in which the method comprises a provision step. The first busbar, second busbar, capacitor element, and the cooling device are provided in the provision step. The method also comprises an assembly step, in which the at least one capacitor element is placed between the first busbar and the second busbar, the capacitor element is electrically connected at the first side to the first busbar and at the second side, opposite the first side, to the second busbar. The cooling device is also placed on the first busbar to remove heat therefrom. The method also comprises a step for securing the first busbar, second busbar, capacitor element, and cooling device with a fixative, thus producing the capacitor unit.

The method can be automated or carried out manually. The method can be implemented as a casting process.

The invention shall be explained in greater detail in reference to the drawings.

DETAILED DESCRIPTION

Figure 1:
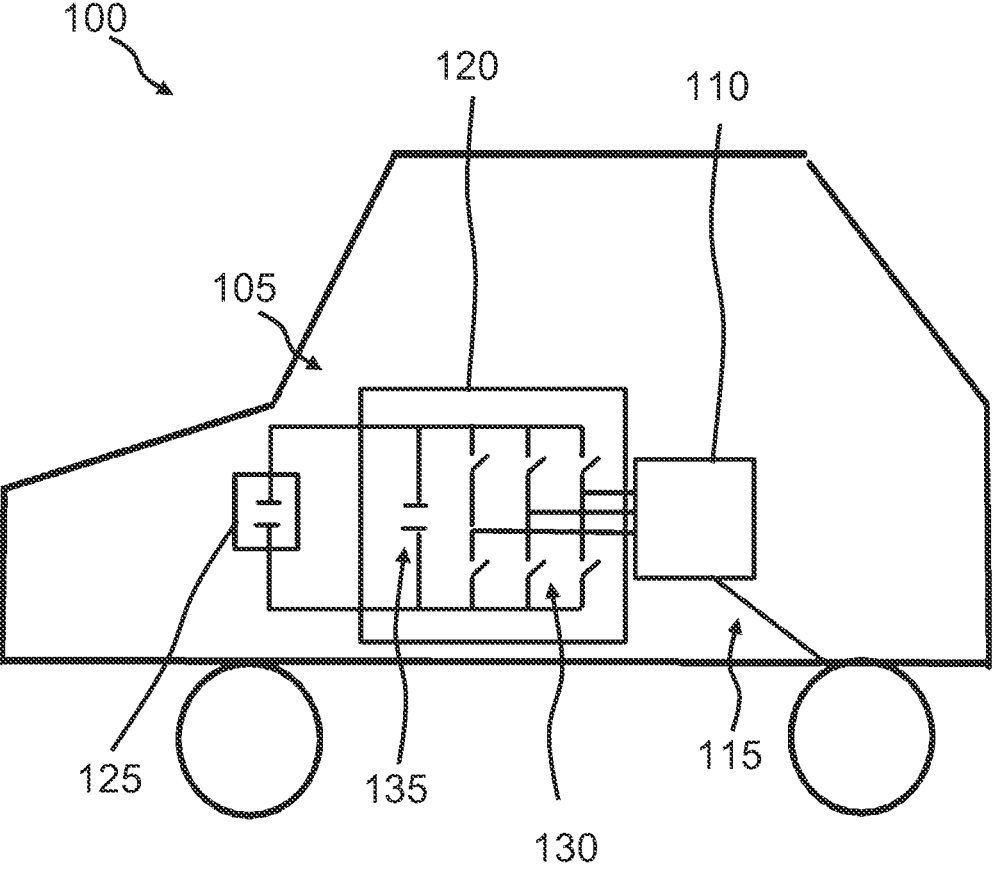
FIG. 1 shows a schematic illustration of a motor vehicle according to an exemplary embodiment.

The same or similar reference symbols are used in the following description of exemplary embodiments of the present invention for the elements shown in the drawings with similar functions, wherein the descriptions of these elements shall not be repeated.

FIG. 1 shows a schematic illustration of a motor vehicle 100 according to an exemplary embodiment. The motor vehicle 100 is also referred to as a vehicle and has an electric axle drive 105, which in turn has at least one electric machine 110, one transmission 115, and one power converter 120, in particular an inverter. The electric machine 110 is also referred to as a drive unit or an electric motor, and is coupled to the transmission 115. The motor vehicle 100 also has a power supply device 125 in the form of a battery. The power converter 120 is interconnected between the power supply device 125 and the electric machine 110. The power converter contains numerous switches 130, e.g. six. The power converter 120 also has a capacitor unit 135, which shall be explained in greater detail in reference to the following figures.

In other words, the vehicle 100 has a link capacitor forming a capacitor unit 135 for the automotive power converter 120 with an improved cooling, as shall be explained in greater detail in reference to the following figures.

Figure 2:
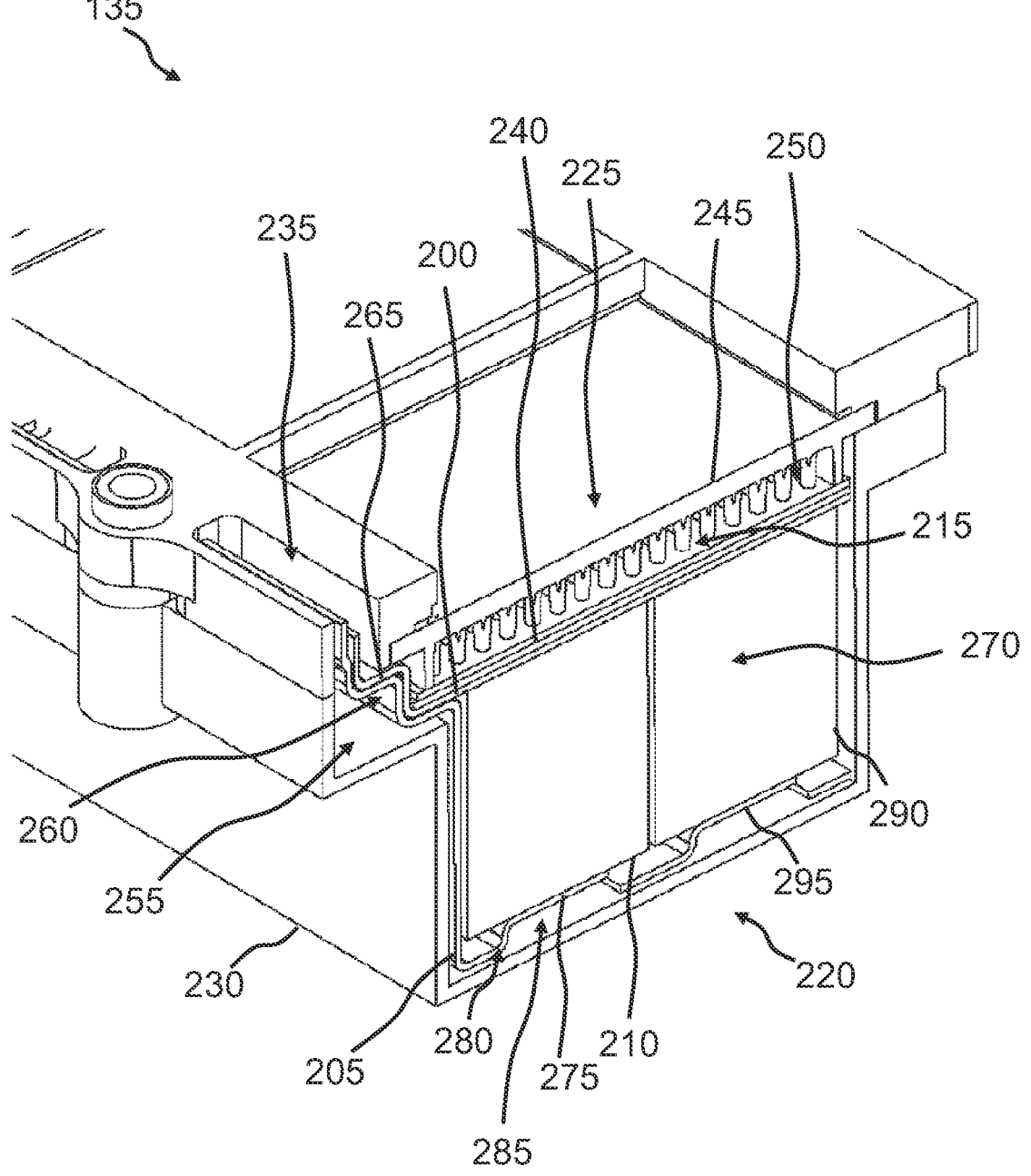
FIG. 2 shows a schematic illustration of a capacitor unit according to an exemplary embodiment.

FIG. 2 shows a schematic illustration of a capacitor unit 135 according to an exemplary embodiment. The capacitor unit 135 is used for a power converter such as that described in reference to FIG. 1. The capacitor unit 135 contains a first busbar 200, a second busbar 205, and at least one capacitor element 210, which is in between the busbars 200, 205. The capacitor element 210 is also referred to as a winding, and is electrically connected at a first side 215 to the first busbar 200 and at a second side 220 to the second busbar 205. The first side 215 and second side 220 are opposite one another. The capacitor unit 135 also has a cooling device 225 that is thermally coupled to the first busbar over with a surface area contact. The cooling device 225 is designed to remove heat from the first busbar 200 through the surface area in contact therewith. More precisely, the cooling device 225 in this exemplary embodiment is on the first side 215 of the capacitor element 210.

The capacitor unit 135 has a housing 230 that encases the individual components described above. The housing 230 is designed to protect these components from external effects in a liquid-tight manner. Examples of external effects are temperature changes or the ingress of moisture or particles. The housing 230 also has a hole 235 through which a fixative can be injected into the housing.

The cooling device 225 in this exemplary embodiment has an electrically insulating thermal conductor 240 and a cooling body 245 for discharging heat. By way of example, the cooling body 245 has cooling fins 250. The thermal conductor 240 is located between the first busbar 200 and the cooling body 245 and thermally coupled thereto. More precisely, the thermal conductor 240 is designed to transfer heat from the first busbar 200 to the cooling body 245. By way of example, the thermal conductor 240 is formed by an adhesive film, or by a thermally conductive paste.

The busbars 200, 205 in this exemplary embodiment have two different sections. In a first section, referred to herein as the edge region 255, the busbars are substantially parallel to one another. More precisely, the busbars 200, 205 have numerous steps 260 in the edge region 255, the free ends of which steps 260, and therefore the busbars 200, 205, end in the hole 235 in the housing 230. The individual sections of the steps are the same size and shape, such that they are at least nearly the same length and height. There is also an insulating layer 265 between the busbars 200, 205 in the edge region 255, which electrically insulates the busbars 200, 205 from one another. By way of example, this insulating layer 265 is formed by an insulating paper. A capacitor region 270 is adjacent to the edge region 255, in which the capacitor element 210 is in between the busbars 200, 205, which are spaced further apart in the capacitor region 270 than in the edge region 255.

The busbar 205 on the second side 220 of the capacitor element 210 has at least one spring element 275 that is pretensioned against the capacitor element 210. This spring element 275 is designed to press the capacitor element 210 toward the first busbar 200 to compensate for tolerances in the capacitor element 210. The spring element 275 in this exemplary embodiment is also step-shaped, such that it comes in contact with the capacitor element 210 over its surface area. This means that the spring element 275 is coupled at a short section 280 to the second busbar 205 and the other end is free. The free end corresponds to the long section 285 of the spring element 275, with which the spring element 275 is in contact with the capacitor element 210. The short section 280 is therefore also referred to as the connecting section.

The capacitor unit 135 has at least one more capacitor element 290 in one exemplary embodiment. This other capacitor element is between the first busbar 200 and the second busbar 205 and is also electrically connected to the first busbar and second busbar like the first capacitor element 210. The capacitor elements 210, 290 can be different, in that one of the capacitor elements 210, 290 may have more windings than the other. The second busbar 205 also has a second spring element 290 that corresponds to the first spring element 275, which is electrically connected to the second capacitor element 290.

In general, it is increasingly important to effectively cool link capacitors such as the capacitor unit 135 described herein, because the voltages, currents, and switching frequencies in modern power converters are higher, resulting in higher power losses and temperatures in the capacitor unit 135. The capacitor units 135 are structured such that they can be effectively cooled with the cooling device 225, also referred to as a cooler. The surface area and optimized cooling of the link capacitor is therefore characterized in that one of the two busbars 200, 205, also simply referred to as buses, in particular the first busbar 200, bears directly on the cooling device 225 over its surface area, and the thermal conductor 240 in the form of an adhesive film is placed between the cooling device 225 and the first busbar. The different dimensions and/or tolerances of the capacitor elements 210, 290 are compensated for by the spring elements 275, 295 toward the bottom, i.e. toward the second side 220.

In other words, the capacitor unit 135 can be summarized in that one of the two busbars 200, 205 bears with its surface area on the cooling device 225 without any air gaps. There is also a thermally conductive adhesive film between the cooling device 225 and the first busbar 200 in an exemplary embodiment. The adhesive film is electrically insulating, and differences in dimensions and/or tolerances of the capacitor elements 210, 290 are compensated for toward the bottom, i.e. toward an opposite side of the cooling device 225. The spring elements 275, 295 on the second busbar 205 are also used to compensate for tolerances. The capacitor unit 135 is or can be placed, optionally, as a complete and electrically conductive component in the power converter, and the overall inverter system can be potted, for example.

Figure 3:
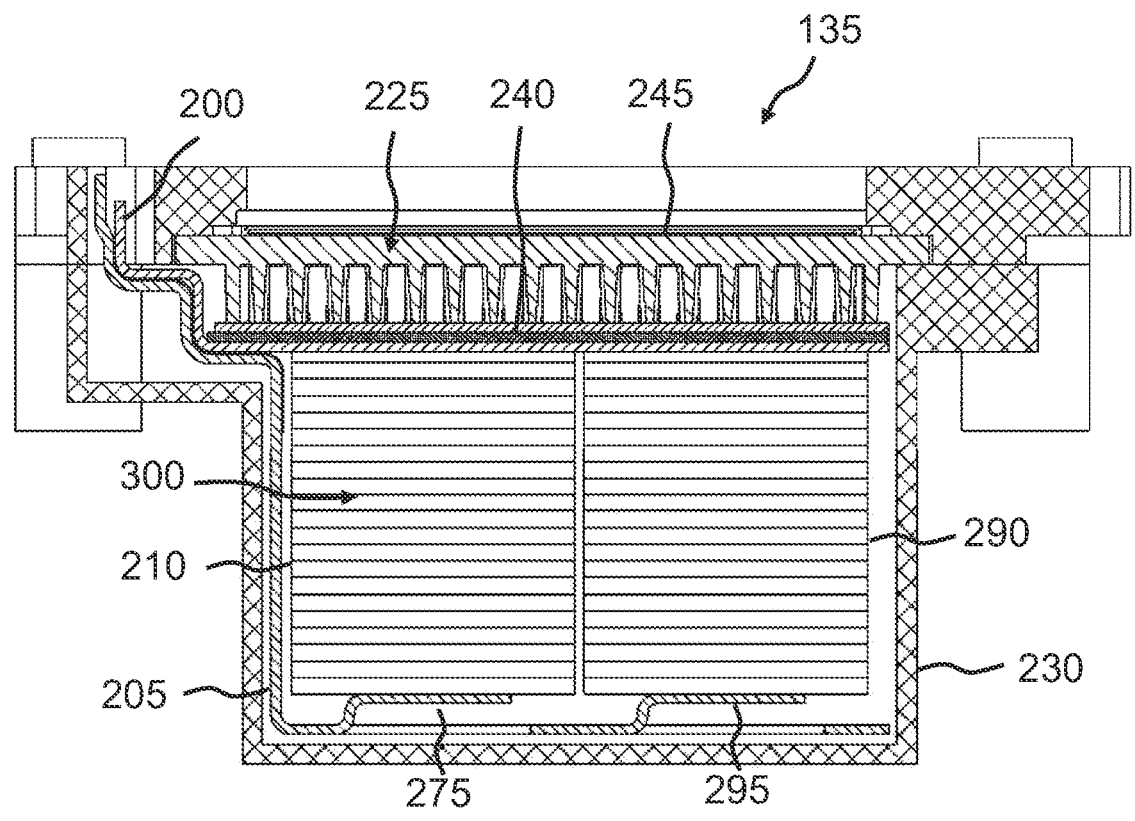
FIG. 3 shows a schematic illustration of an exemplary embodiment of a capacitor unit.

FIG. 3 shows a schematic illustration of an exemplary embodiment of a capacitor unit 135. This capacitor unit 135 corresponds, or is similar, to the capacitor unit 135 described reference to at least one of the FIGS. 1 and 2. More precisely, this capacitor unit 135 corresponds to the capacitor unit shown in FIG. 2, but is shown from a different perspective in FIG. 3. The first capacitor element 210 and second capacitor element 290 have the same number windings 300 in this exemplary embodiment. This capacitor unit 135 also has the cooling device shown in FIG. 2, with the thermal conductor 240 and the cooling body 245 in contact with the first busbar 200.

Figure 4:
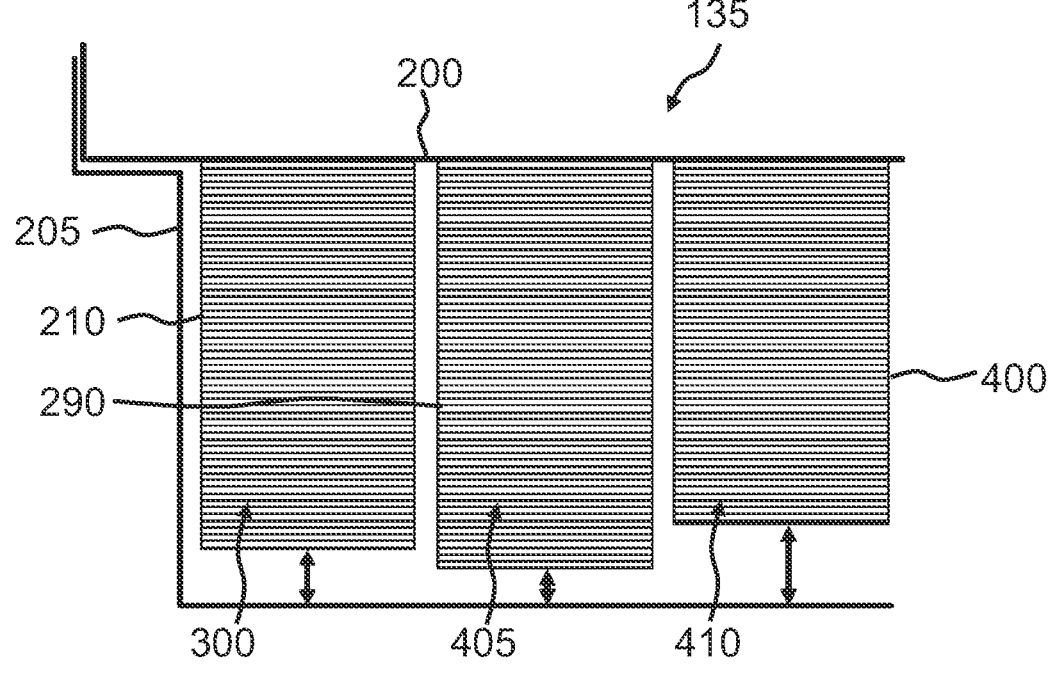
FIG. 4 shows a schematic illustration of an exemplary embodiment of a capacitor unit.

FIG. 4 shows a schematic illustration of an exemplary embodiment of a capacitor unit 135. This capacitor unit 135 is similar to the capacitor unit 135 described in reference to FIGS. 1 to 3. The capacitor unit 135 in this exemplary embodiment has three capacitor elements 210, 290, 400, each of which has a different number of windings 300, 405, 410, such that the distances between these capacitor elements 210, 290, 400 and the second busbar 205 differ. In other words, this capacitor unit 135 corresponds to the capacitor unit 135 described in reference to FIGS. 2 and 3, with the exception that the capacitor unit 135 has three capacitor elements 210, 290, 400, each of which has a different number of windings 300, 405, 410. The capacitor unit 135 in this exemplary embodiment is also shown without a cooling device. It can be seen that the dimensions of the windings 300, 405, 410 differ from one another.

Figure 5:
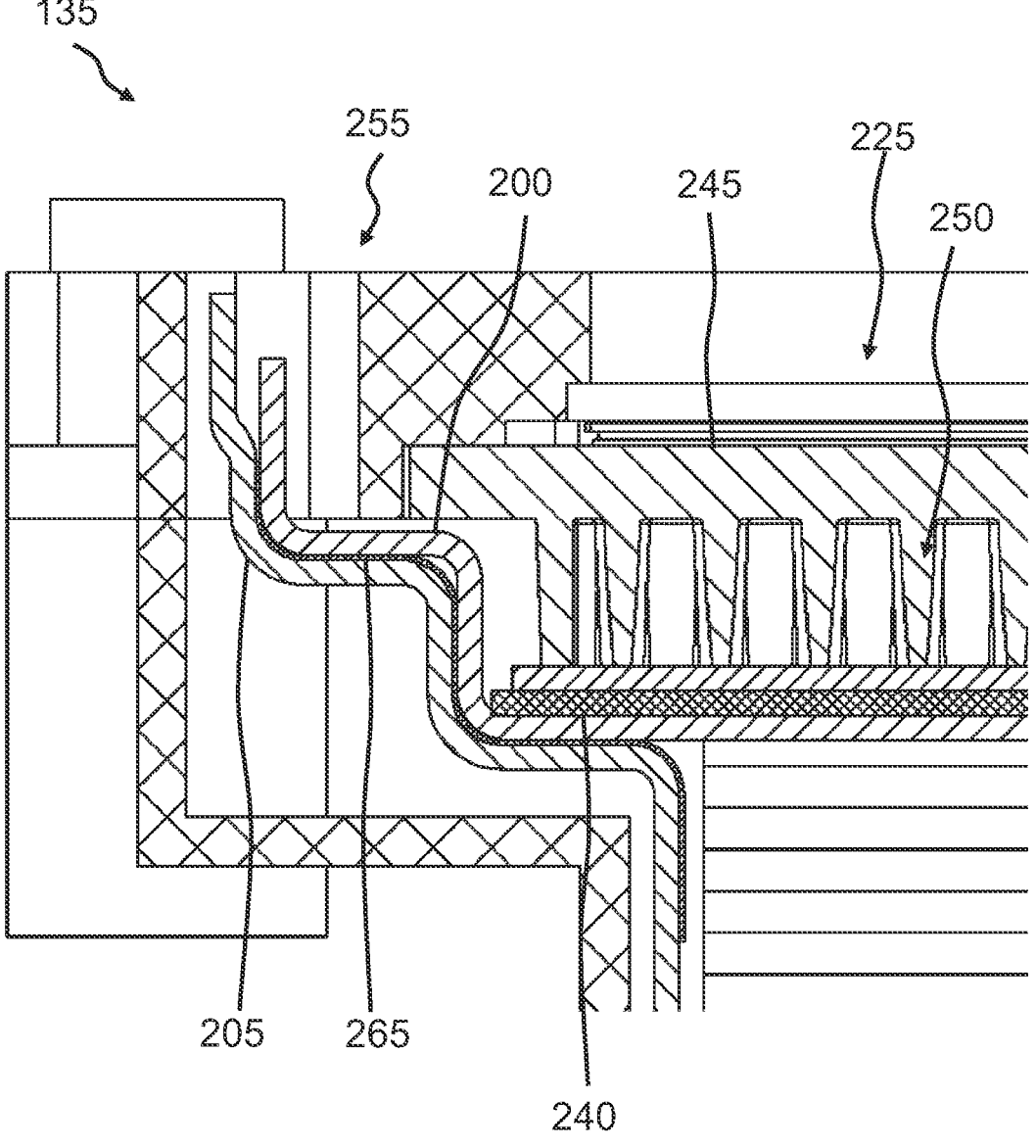
FIG. 5 shows a schematic illustration of an exemplary embodiment of a capacitor unit.

FIG. 5 shows a schematic illustration of an exemplary embodiment of a capacitor unit 135. The capacitor unit 135 corresponds, or is similar, to the capacitor unit 135 described in reference to the FIGS. 1 to 4. More precisely, this capacitor unit 135 corresponds to the capacitor unit in FIG. 2, although only part of the capacitor unit 135 is shown in FIG. 5. FIG. 5 only shows an enlargement of the edge region 225.

Figure 6:
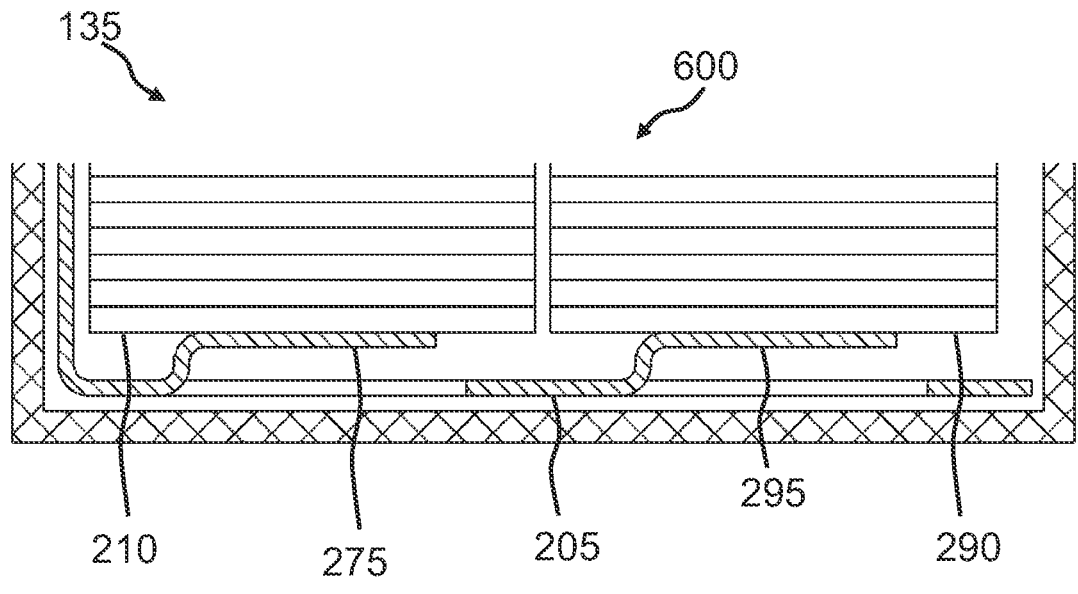
FIG. 6 shows a schematic illustration of an exemplary embodiment of a capacitor unit.

FIG. 6 shows a schematic illustration of an exemplary embodiment of a capacitor unit 135. This capacitor unit 135 corresponds, or is similar, to the capacitor unit 135 described in reference to FIGS. 1 to 4, wherein a contact region 600 for the second busbar 205 is enlarged herein, showing the contact between the spring element 275 and the capacitor element 210, and the contact between the spring element 295 and the second capacitor element 290.

Figure 7:
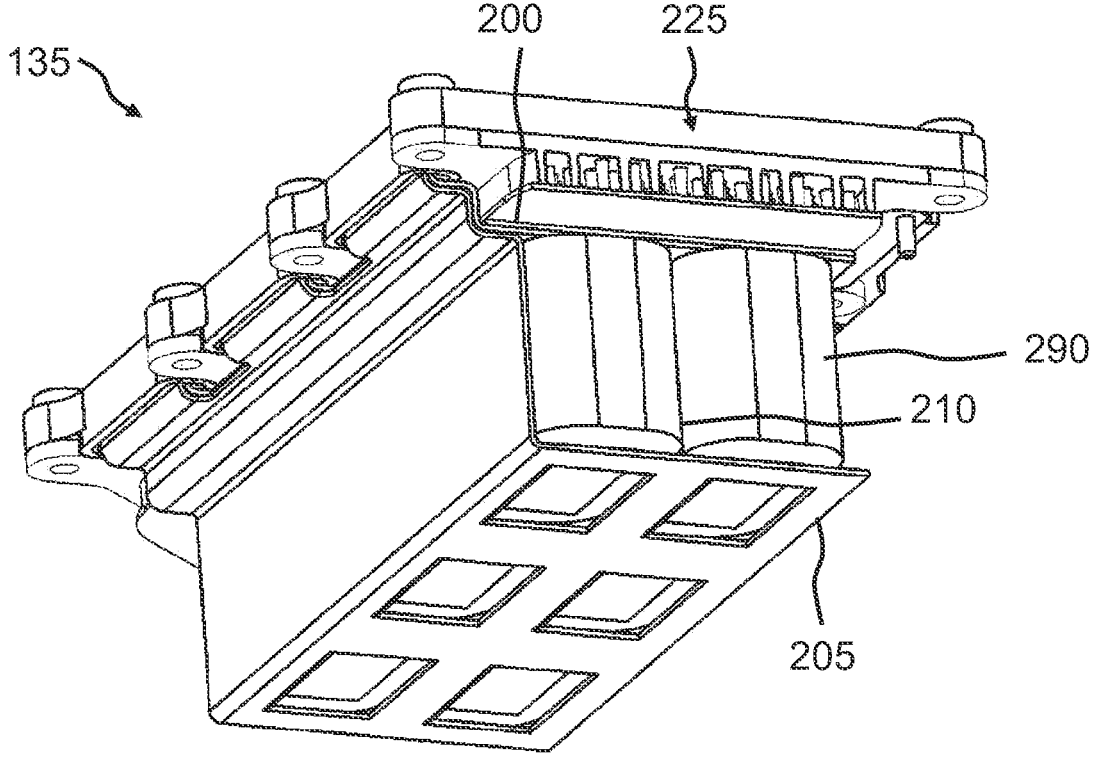
FIG. 7 shows a schematic illustration of an exemplary embodiment of a capacitor unit.

FIG. 7 shows a schematic illustration of an exemplary embodiment of a capacitor unit 135. The capacitor unit 135 is similar to the capacitor unit 135 described in reference to FIGS. 1 to 6, but is shown without a housing in this exemplary embodiment. The number of capacitor elements 210, 290 in this exemplary embodiment can also vary.

Figure 8:
FIG. 8 shows a flow chart for an exemplary embodiment of a method for producing a capacitor unit.
Figure 8:
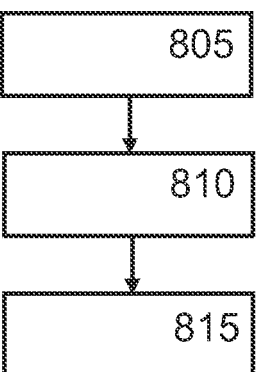

FIG. 8 shows a flow chart for an exemplary embodiment of a method 800 for producing a capacitor unit. The method 800 is used to produce a capacitor unit such as that described in reference to FIGS. 1 to 7. The method 800 comprises a provision step 805, an assembly step 810, and a securing step 815.

The first busbar, second busbar, capacitor element, and cooling device are provided in the provision step 805. The at least one capacitor element is placed between the first busbar and the second busbar, and the first side of the capacitor element is electrically connected to the first busbar, while the second side of the capacitor element is electrically connected to the second busbar in the assembly step 810. The cooling device is also placed on the surface of the first busbar, i.e. in a planar manner, in the assembly step 810, in order to remove heat from the first busbar. The first busbar, second busbar, capacitor element and cooling device are secured in place with a fixative, e.g. a potting compound, in the securing step 815, to produce the capacitor unit.

The exemplary embodiments described in reference to the drawings are selected merely by way of example. Different exemplary embodiments can be combined with one another, in their entirety or with regard to individual features. One exemplary embodiment can also be supplemented by features of another exemplary embodiment.

If an exemplary embodiment contains an "and/or" conjunction between a first feature and a second feature, this can be read to mean that the exemplary embodiment in one version contains both the first and second features, and in another version, contains either just the first feature or just the second feature.

REFERENCE SYMBOLS 100 motor vehicle
105 electric axle drive
110 electric machine
115 transmission
120 power converter
125 power supply unit
130 numerous switches
135 capacitor unit
200 first busbar
205 second busbar
210 capacitor element
215 first side
220 second side
225 cooling device
230 housing
235 hole
240 thermal conductor
245 cooling body
250 cooling fins
255 edge region
260 steps
265 insulating layer
270 capacitor region
275 spring element
280 short section
285 long section
290 second capacitor element
295 second spring element
300 windings
400 additional capacitor element
405 winding
410 winding
600 contact region
800 method for producing a capacitor unit
805 provision step
810 assembly step
815 securing step

The invention claimed is:

1. A capacitor unit for a power converter, comprising:
a first busbar;
a second busbar;
at least one capacitor element located between the first busbar and the second busbar, wherein the at least one capacitor element is electrically connected at a first side to the first busbar, and wherein the at least one capacitor element is electrically connected at a second side, opposite the first side, to the second busbar; and
a cooling device thermally coupled to the first busbar over with a surface area contact, wherein the cooling device is configured to remove heat from the first busbar,
wherein free ends of the first and second busbars in an edge region end in a hole of a housing of the capacitor unit, and
wherein the hole is configured to allow a fixative to be injected into the housing.

2. The capacitor unit according to claim 1, wherein the cooling device comprises an electrically insulating thermal conductor and a cooling body for discharging heat,
wherein the thermal conductor is in between the first busbar and the cooling body and thermally coupled thereto, and
wherein the thermal conductor is configured to transfer heat from the first busbar to the cooling body.

3. The capacitor unit according to claim 2, wherein the thermal conductor is formed by an adhesive film.

4. The capacitor unit according to claim 1, wherein the second busbar at the second side of the at least one capacitor element has at least one spring element that is pretensioned against the at least one capacitor element and is configured to press the at least one capacitor element toward the first busbar.

5. The capacitor unit according to claim 4, wherein the at least one spring element is step-shaped such that it comes in contact with the at least one capacitor element over its surface area.

6. The capacitor unit according to claim 1, wherein the first and second busbars are step-shaped in an edge region, wherein the at least one capacitor element is located between the first and second busbars in a capacitor region adjoining the edge region.

7. The capacitor unit according to claim 1, wherein
the housing is configured to encase at least a part of the first and second busbars, the at least one capacitor element, and the cooling device in a liquid-tight manner.

8. The capacitor unit according to claim 1, comprising:
an insulating layer configured to electrically insulate the first busbar and second busbar from one another,
wherein the insulating layer is in between the first busbar and the second busbar.

9. The capacitor unit according to claim 8, wherein the insulating layer is formed by an insulating paper.

10. The capacitor unit according to claim 8, wherein the insulating layer is placed in the edge region of the first and second busbars that is step-shaped.

11. The capacitor unit according to claim 1, comprising:
at least one second capacitor element that is in between the first busbar and the second busbar, wherein the at least one second capacitor element is electrically connected to the first busbar at its first side, and wherein the at least one second capacitor element is electrically connected to the second busbar at its second side.

12. A power converter, comprising the capacitor unit according to claim 1.

13. The power converter according to claim 12, wherein the power converter comprises an inverter.

14. The power converter according to claim 12, wherein the capacitor unit forms a link capacitor.

15. An electric axle drive for a motor vehicle, comprising:
at least one electric machine,
a transmission; and
the power converter according to claim 12.

16. A motor vehicle, comprising:
a capacitor unit according to claim 1.

17. The capacitor unit according to claim 1, wherein the first and second busbars each have a plurality of steps in the edge region, and wherein free ends of the plurality of steps of the first and second busbars in the edge region end in the hole of the housing of the capacitor unit.

18. The capacitor unit according to claim 1, wherein the hole and the cooling device are disposed on a same side of the at least one capacitor element.

19. The capacitor unit according to claim 18, wherein the hole is offset laterally relative to the cooling device.

20. A method for producing a capacitor unit, the method comprises:

providing a first busbar and a second busbar, at least one capacitor element, and a cooling device;

placing the at least one capacitor element between the first busbar and the second busbar, wherein the at least one capacitor element is electrically connected to the first busbar at its first side, and wherein the at least one capacitor element is electrically connected to the second busbar at its second side, lying opposite its first side, and placing the cooling device such that it is in surface area/planar contact with the first busbar to remove heat from the first busbar;

providing a housing configured to encase at least a part of the first and second busbars, the at least one capacitor element, and the cooling device, wherein the housing includes a hole configured to allow a fixative to be injected into the housing;

placing free ends of the first and second busbars in an edge region in the hole of the housing; and securing the first busbar, the second busbar, the at least one capacitor element, and the cooling device with the fixative to produce the capacitor unit.

\* \* \* \* \*